United States Patent [19]

Nakahara et al.

[11] 4,076,765

[45] Feb. 28, 1978

[54] UNSATURATED EPOXY ESTER RESIN

[75] Inventors: Makoto Nakahara, Osaka; Yoshiya Fukuyama, Hirakata; Kazuo Sumiyoshi, Toyonaka; Katsuo Akagane, Ashiya, all of Japan

[73] Assignee: Sumitomo Chemical Company, Limited, Osaka, Japan

[21] Appl. No.: 720,079

[22] Filed: Sep. 2, 1976

[30] Foreign Application Priority Data

Sep. 9, 1975 Japan .............................. 50-109744

[51] Int. Cl.² ............................................. C08L 63/00
[52] U.S. Cl. ................................. 260/835; 260/836; 260/837 R
[58] Field of Search ................... 260/836, 837 R, 835

[56] References Cited

U.S. PATENT DOCUMENTS

| | | | |
|---|---|---|---|
| 2,862,562 | 3/1958 | Shokal | 260/837 R |
| 3,367,992 | 2/1968 | Bearden | 260/837 R |
| 3,420,914 | 1/1969 | May | 260/837 R |
| 3,432,478 | 3/1969 | May | 260/837 R |
| 3,564,074 | 2/1971 | Swisher | 260/837 R |
| 3,634,542 | 1/1972 | Dowd | 260/837 R |
| 3,773,856 | 11/1973 | Takiyama | 260/837 R |
| 3,808,114 | 4/1974 | Tsuchihara | 260/836 |
| 3,932,556 | 1/1976 | Takamori | 260/836 |
| 3,933,935 | 1/1976 | Zachariades | 260/836 |
| 4,010,289 | 3/1977 | Kobayashi | 260/837 R |

*Primary Examiner*—Paul Lieberman
*Attorney, Agent, or Firm*—Wenderoth, Lind & Ponack

[57] ABSTRACT

Unsaturated epoxy esters with improved curability are prepared by the reaction of (1) a partial esterification compound obtained from trimellitic anhydride and/or pyromellitic anhydride and an unsaturated monoalcohol; (2) (i) a partial esterification compound obtained from a dicarboxylic anhydride and an unsaturated monoalcohol and/or (ii) a polymerizable unsaturated monobasic acid; and (3) a compound containing at least two epoxy groups in one molecule; if desired in the presence of (4) a dicarboxylic acid or a saturated or unsaturated alkyd having carboxyl groups at both terminals and/or a saturated or unsaturated monoglycidyl compound.

18 Claims, No Drawings

UNSATURATED EPOXY ESTER RESIN

The present invention relates to novel unsaturated epoxy esters with improved curability which are useful as molding materials or corrosion-resisting structural materials, and a process for the production thereof.

Epoxy resins, which are making rapid progress in the field of molding materials and corrosion-resisting structural materials, have excellent advantages in adhesiveness, resistance to chemicals, etc., as conjectured from their structure. However, said resins have defects in that the selection of hardeners is difficult and the curability at room temperature is not good enough.

On the other hand, unsaturated polyester resins have better properties in curability and workability than epoxy resins. Thus, unsaturated polyester resins can be cured under substantially arbitrary conditions at room temperature or at elevated temperatures by using a small amount of an organic peroxide and, if desired, a small amount of a polymerization accelerator in the curing treatment. However, said resins have not been satisfactory in dimensional stability, surface hardness, electric characteristics, etc. of molded articles for various applications. On the other hand, diallyl phthalate resins, known as molding materials of a similar kind, have excellent properties in dimensional stability, heat resistance, electric characteristics, etc.

Therefore, if a resin is realized which has the curability and working facility of unsaturated polyester resins and the dimensional stability, heat resistance and electric characteristics of diallyl phthalate resins in addition to the good properties of epoxy resins and which is further improved by overcoming the low impact resistance and slow curing speed which are the defects of diallyl phthalate resins, such a resin would be an ideal one. Accordingly, much work on epoxy ester resins has been carried out which comprises reacting an epoxy resin with an unsaturated acid, because the resulting resins will have the properties of epoxy resins and unsaturated polyester resins in combination.

An example of such work comprises reacting an unsaturated monobasic acid or dicarboxylic acid half-ester with an epoxy compound to form epoxy ester resins. In this case, since one -COOH group in the acid component links to both terminals of the epoxy compound, the molecular weight of the resulting epoxy ester resin is determined necessarily depending on the molecular weight of the epoxy compound used, and therefore there is a disadvantage that the molecular weight regulation (attainment of a high molecular weight) can not be done arbitrarily.

That the molecular weight regulation can not be done arbitrarily means that, unless an epoxy compound having a relatively low molecular weight is used, a concentration of unsaturated groups (ratio of unsaturated groups in one molecule) necessary for curing is not sufficiently maintained. This also means that, since unsaturated groups having self-polymerizability are present only at both terminals of the epoxy resin, the curability is low. Therefore, the resins of this kind are limited to those having a relatively low molecular weight.

Even if the attainment of a high molecular weight is attempted to improve the physical properties by using a high molecular weight epoxy compound, the concentration of unsaturated groups is lowered, thus lowering the curability. In addition it becomes necessary to dilute with another monomer to regulate the viscosity so that the workability is greatly lowered. Further, where a polyfunctional novolac type epoxy compound is used as one of the reaction materials, the concentration of unsaturated groups in the product may be sufficient, but even so, since unsaturated monobasic acid which is the other reaction material has a strong tendency to polymerize itself, gellation may take place during the esterification reaction, or because of a high viscosity, undesirable solvent reaction is required.

It is also known to use an acid compound obtained by replacing a part of the above-mentioned unsaturated monobasic acid with a polybasic acid. In this case, since the polybasic acid is linked to the main chain of the epoxy ester, the molecular weight regulation (attainment of a high molecular weight) becomes possible to some extent. However, since unsaturated groups having self-polymerizability are not present in the main chain similarily to the previous case, the curability is poor. In addition, there is a defect that the viscosity increases and stirring becomes impossible during the esterification reaction so that gellation is liable to occur. To prevent such gellation, there are often cases which require the addition of organic solvents or other polymerizable monomers, for example styrene, acrylic esters, etc. as viscosity decreasing agents. However, where a solvent is added, it must be recovered after the reaction, and moreover complete recovery and removal of the solvent is extremely difficult. The remaining solvent in the resulting resin is a cause of impairing the properties of the resin. Where a monomer is used, the monomer becomes a component of the resulting resin so that the apparent molecular weight is increased. However, there is a fear that the concentration of unsaturated groups in the product resin may be lowered to make the curability poor, or the resin may be modified by the monomer component so that the physical properties are undesirably changed. In this process the esterification reaction is carried out usually in such a material ratio that epoxy groups are considerably in excess over carboxyl groups. Therefore, unreacted active groups are present in the resulting product so that the pot or shelf life is short, and also there is often a problem in the toxicity of the product.

Besides these processes, another process for producing epoxy ester resins is known which comprises reacting an epoxy compound with an unsaturated dibasic monomer obtained from an unsaturated dibasic acid and a saturated monoalcohol, a part of which may be replaced by a saturated or unsaturated polybasic monoester if desired. By this process, gellation rarely occurs during the esterification reaction and the attainment of a high molecular weight is possible. However, the resulting resin does not have any unsaturated group having self-polymerizability in the main chain and at both terminals. This results in very poor curability, and since, for example, the polymerization of the resin by itself upon molding is not expected, the properties of the end product thus obtained are very bad, so that in the curing treatment another cross-linkable monomer is required. Thus this process is very disadvantageous in practical use.

In the light of such a situation, the present inventors have made an intensive study to produce epoxy ester resins improved in the above-mentioned respects, especially in curability. As a result, paying attention to the polymerizale double bond of unsaturated monoalcohols, the inventors have found that, by using, as a part of the acid component, a partially esterified product of polybasic acids, especially trimellitic anhydride or pyromellitic anhydride, obtainable by using said unsaturated monoalcohol as the esterifying agent, unsaturated groups having self-polymerizability can be also introduced into the main chain and therefore the curability can be markedly improved.

The present invention provides novel unsaturated epoxy esters with improved curability, which are produced by the reaction of (1) a partial esterification compound obtained from trimellitic anhydride and/or pyromellitic anhydride and an unsaturated monoalcohol; (2) (i) a partial esterification compound obtained from a dicarboxylic anhydride and an unsaturated monoalcohol and/or (ii) a polymerizable unsaturated monobasic acid; and (3) a compound containing at least two epoxy groups in one molecule. If desired, the present epoxy esters may be obtained by conducting the reaction in the presence of (4) (i) a dicarboxylic acid or a saturated or unsaturated alkyd having carboxyl groups at both terminals and/or (ii) a saturated or unsaturated monoglycidyl compound.

According to the present invention, the molecular weight and the degree of cross-linkage of the epoxy ester resins can be regulated easily and no gellation occurs during the reaction. Accordingly, the addition of solvent or another monomer in the reaction system is not necessary. Furthermore, since the resulting resin contains unsaturated groups having self-polymerizability at both terminals and in the main chain, the resin is excellent in self-polymerizability, so that in curing it is not always necessary to add any other cross-linkable monomer. Thus the resin is very excellent in curability. In addition, the resins of the present invention also include those having allyl ester groups and allyl ether groups, which exhibit the above-mentioned desirable features of diallyl phthalate resins. Moreover, because the resulting resins contain a very small amount of unreacted carboxyl groups and epoxy groups, they have very good stability and low toxicity.

One of important features of the present invention is to use unsaturated monoalcohols as the esterifying agents to produce the partial esterification compound of trimellitic and/or pyromellitic acid. Among such unsaturated monoalcohols there may be recited those having self-polymerizability, such as 2-hydroxyethyl acrylate, 2-hydroxyethyl methacrylate, 2-hydroxypropyl acrylate, 2-hydroxybutyl acrylate, 2-hydroxybutyl methacrylate, allyl alcohol, methallyl alcohol, etc., in which the terms 2-hydroxyalkyl acrylates and methacrylates include their hydroxyalkylated derivatives. For example, as commercially available compounds, 2-(2-hydroxyethoxy)ethyl acrylate and its higher ethylhydroxylated derivatives containing about 2–6 mole reacted ethylene oxide can be mentioned.

These unsaturated monoalcohols may be used singly or as a mixture. One may think of using saturated alcohols as a part of the unsaturated alcoholic component to modify the properties of the resin, but such is not desirable because the purpose of obtaining resins having good curability, the object of the present invention, can hardly be attained. Even if saturated alcohol is used together with the unsaturated monoalcohol, the amount must be so small that the curability is not lowered.

The dicarboxylic acid anhydrides used in the present invention are saturated or unsaturated dibasic acids having an anhydride ring in the molecule, such as phthalic anhydride, maleic anhydride, succinic anhydride, tetrahydrophthalic anhydride, hexahydrophthalic anhydride, HET anhydride, etc. These can be used singly or as a mixture.

The same unsaturated monoalcohols as described above are used for producing the partial esterification compound of the dicarboxylic acid.

Among the polymerizable unsaturated monobasic acids, there may be mentioned for example acrylic acid, methacrylic acid, and crotonic acid. The above-mentioned dicarboxylic anhydrides are reacted with the unsaturated monoalcohols so as to form dicarboxylic acid partial esters having polymerizable unsaturated group and may be used as polymerizable unsaturated monobasic acids.

The dicarboxylic acid partial esters and polymerizable unsaturated monobasic acids are used singly or as a mixture of these.

The epoxy compounds having at least two epoxy groups in one molecule are those of glycidyl ether type usually synthesized from epichlorohydrin or methylepichlorohydrin and a compound having a hydroxyl group. For example there may be recited the glycidyl ether of 2,2-bis(4-hydroxyphenyl)propane, polyglycidyl ether obtained by reacting epichlorohydrin with the so-called novolac obtained by reacting phenol with formaldehyde, triglycidyl ether of glycerin and tetraglycidyl ether of tetraphenylethane.

These are used singly or as a mixture. To make the molecular weight regulation easy, epoxy compounds having two epoxy groups are desirable for the purpose of the invention.

In the present invention, the above-mentioned various components are essential. However, in accordance with particular object, for example to regulate resin viscosity, molecular weight, or curability, one or more kinds of dicarboxylic acids, saturated or unsaturated alkyd having carboxyl groups at both terminals, and saturated or unsaturated monoglycidyl compounds may be added to the reaction system.

Among the above dicarboxylic acids, there may be mentioned for example maleic acid, fumaric acid, itaconic acid, adipic acid, isophthalic acid and terephthalic acid, and the saturated or unsaturated alkyds having carboxyl groups at both terminals are for example those obtained by heat-reacting a polyhydric alcohol with a polyvalent carboxylic acid as in the case of production of general unsaturated polyester resins. As regards the reaction ratio, in the case of the production of general unsaturated polyester resins, the acid component and glycol component are reacted either at a substantially equal molar ratio or in some excess of the glycol component, while those used in the present invention are alkyds having terminal carboxyl groups obtained by using an excess of the acid component for the reaction. The preferred reaction ratio is 1.01 – 10 mols of carboxyl groups of the polyvalent carboxylic acid per mol of hydroxyl groups of the polyhydric alcohol.

The saturated or unsaturated monoglycidyl compounds are saturated monoglycidyl compounds such as phenylglycidyl ether and butylglycidyl ether; or polymerizable unsaturated monoglycidyl compounds such as allylglycidyl ether, glycidyl methacrylate and glycidyl acrylate.

As regards the ratio of the polybasic acid component to the monobasic component in the present invention, it is so selected that the partial esterification compound (1) obtained from trimellitic and/or pyromellitic anhydride and the unsaturated monoalcohol, is generally 25 to 95, preferably 30 to 80 mole %, based on the total moles of the whole acid component, e.g. the said partial esterification compound plus the partial esterification compound (2)-(i) obtained from the dicarboxylic anhydride and the unsaturated monoalcohol, and/or the polymerizable unsaturated monobasic acid (2)-(ii). Where the dicarboxylic acid or a saturated or unsaturated alkyl having carboxyl groups at both terminals (4)-(i), which corresponds to the polybasic acid component, is added to the reaction system, it is added in such an amount that the ratio of the polybasic acid component does not exceed the above defined limit.

Where this ratio is in excess of 95 mole %, the increase of the molecular weight become large so that the control of the reaction becomes difficult. Where the ratio is less than 25 mole %, the attainment of a high molecular weight can not be expected, and also the amount of introduction of polymerizable unsaturated groups becomes small, so that the curability of the obtained product becomes poor.

The outline of the process of the present invention is as follows:

The esterification of trimellitic anhydride and/or pyromellitic anhydride with the unsaturated monoalcohol, and the esterification of a dicarboxylic acid anhydride with the unsaturated monoalcohol are carried out at 80° to 150° C. in the presence or absence of air. It is preferable that the unsaturated monoalcohol is equimolar or a little in excess to the whole acid. To eliminate the gellation during the reaction, it is preferable to carry out the reaction using a suitable amount of a polymerization inhibitor such as hydroquinone, paratert-butylcatechol, methylhydroquinone, methoxyhydroquinone, benzoquinone, etc. If any anhydride rings of the acid component remain unreacted in the reaction product, they exert an adverse effect on the subsequent secondary reaction, so that it is preferable that the reaction is continued until the reaction reaches at least 90%. In the esterification reaction, the above-mentioned acid components may be reacted as a mixture at the same time, or may be reacted separately. It is, of course, recognized that the esterification of the dicarboxylic acid anhydride is not necessary, where only a polymerizable unsaturated monobasic acid is used without using any partially esterified product of a dicarboxylic acid anhydride. The thus-obtained partially esterified product is used as a reaction material in the subsequent addition reaction.

The addition reaction of the resulting partially esterified product of trimellitic anhydride or/and pyromellitic anhydride and the partially esterified product of the dicarboxylic anhydride and/or the polymerizable unsaturated monobasic acid with the compound having at least two epoxy groups in one molecule is carried out usually at 80° – 200° C. in the presence or absence of the above-mentioned dicarboxylic acid or the alkyl, and/or the monoglycidyl compound. It is preferable that the total number of -COOH groups and the total number of

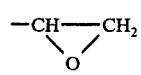

groups in the reaction system in this reaction is substantially equal, and it is generally suitable that the ratio the total number of —COOH groups/total number of

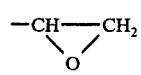

groups is 0.9 to 1.1. Such a ratio is preferable, because, if any unreacted groups remain in the product obtained by this reaction, there will be a problem in toxicity and stability, and such ratio is also favorable for regulating the molecular weight during the reaction.

This addition reaction can produce without any catalyst, but it is effective to use a catalyst such as tertiary amines for example triethylamine; or quaternary ammonium salts for example tetramethylammonium chloride and benzylmethylammonium chloride in order to accelerate the reaction. In this reaction, the presence of a solvent or a polymerizable monomer is not always necessary. But depending on the combination of the starting material compositions, etc., the viscosity may increase at the final stage of the reaction, so that in such a case a solvent or a polymerizable monomer may be used.

The unsaturated epoxy esters obtained by the process of the present invention have unsaturated groups derived from an unsaturated monoalcohol having self-polymerizability not only at both terminals but also in the main chain, so that the resins have very excellent curability. Thus for example the resins can be cured at room temperature in the presence of a polymerization catalyst such as an organic peroxide; or a polymerization accelerator. Of course, depending on the purpose and use, the resin can be used after dilution with other reactive monomer (cross-linking agent) such as acrylic acid esters, methacrylic acid esters, vinylbenzene, vinyltoluene, acrylonitrile, vinyl acetate, diallyl phthalate, etc.

The thus-obtained cured products have the excellent adhesiveness of epoxy resins, good curability, workability of unsaturated polyester resins and excellent electric characteristics and dimensional stability of diallyl phthalate resins and are improved in the impact strength which is low in the case of diallyl phthalate resin shaped products.

The present invention will be explained hereunder by way of examples, wherein parts are by weight.

EXAMPLE 1

A mixture of 148 parts of phthalic anhydride, 57.6 parts of trimellitic anhydride, 75.5 parts of allyl alcohol and 0.13 part of hydroquinone was heated at 90° – 120° C. in a nitrogen atmosphere for 3 hours, and the conversion then reached 94.8%. After the internal temperature was cooled to 80° C., 342 parts of Sumiepoxy ELA-128 (epoxy resin produced by Sumitomo Chemical Co., Ltd., a reaction product of bisphenol A and epichlorohydrin; epoxy equivalent 184 – 194; the viscosity at room temperature 110 – 140 poise), 23.2 parts of fumaric acid, 22.8 parts of allylglycidyl ether and 1.35 parts of triethylamine were added. After sufficient replacement with $N_2$, the temperature of the reaction mixture was elevated. After reaction for 3 hours at 80° to 150° C., the reaction mixture was cooled, and an unsaturated epoxy ester having an acid value of 11.5 was obtained. This resin is referred to as Sample A.

EXAMPLE 2

A mixture of 148 parts of phthalic anhydride, 57.6 parts of trimellitic anhydride, 169 parts of 2-hydroxyethyl methacrylate and 0.29 parts of methylhydroquinone was heated at 90° to 120° C. for 2 hours and 30 minutes, and the conversion (the esterification conversion) then reaches 76.5%. After the internal temperature was cooled to 80° C., 342 parts of Sumiepoxy ELA-128, 23.2 parts of fumaric acid, 28.4 parts of glycidyl methacrylate and 1.5 parts of triethylamine were added, and the temperature of the reaction mixture was elevated. After reaction at 80° to 160° C. for 3 hours, the reaction mixture was cooled, and a solid resin (solid at room temperature) having an acid value of 6.4 was obtained. This resin is referred to as Sample B.

EXAMPLE 3

A mixture of 44.4 parts of phthalic anhydride, 28.8 parts of trimellitic anhydride, 26.1 parts of allyl alcohol and 0.11 part of hydroquinone was heated at 90° to 120° C. in a nitrogen atmosphere for 3 hours, and the conversion then reached 93.8%. After the internal temperature was cooled to 80° C., 323 parts of Sumiepoxy ELA-128, 81.2 parts of fumaric acid, 34.2 parts of allylglycidyl ether and 1.1 parts of triethylamine were added. After sufficient replacement with $N_2$, the temperature of the reaction mixture was cooled, and an unsaturated epoxy ester havingan acid value of 7.2 was obtained. This resin is referred to as Sample C.

EXAMPLE 4

A mixture of 86.1 parts of methacrylic acid, 96 parts of trimellitic anhydride, 65 parts of 2-hydroxyethyl methacrylate and 0.22 part of methylhydroquinone was heated at 90° to 120° C. for 2 hours and 30 minutes in the presence of air, and the conversion then reached 96.2%. After the internal temperature was cooled to 80° C., 380 parts of Sumiepoxy ELA-128 and 1.1 parts of triethylamine were added, and then the temperature of the reaction mixture was elevated. After reaction for 3 hours at 80° – 150° C. to obtain a resin which is solid at room temperature and has an acid value of 4.8. This resin is referred to as Sample D.

EXAMPLE 5

A mixture of 86.1 parts of methacrylic acid, 57.6 parts of trimellitic anhydride, 39 parts of 2-hydroxyethyl methacrylate and 0.29 part of methylhydroquinone was heated at 90° – 120° C. for 2 hours and 30 minutes, and the conversion then reached 97.2%. After 380 parts of Sumiepoxy ELA-128, 23.2 parts of fumaric acid and 1.5 parts of triethylamine were added, the temperature of the reaction mixture was elevated. After reaction for 3 hours at 80° – 160° C., the reaction mixture was cooled to obtain a resin which is solid at room temperature and has an acid value of 11.5. This resin is referred to as Sample E.

Comparative Example 1

A mixture of 98 parts of maleic anhydride, 116 parts of 2-hydroxyethyl acrylate and 0.20 parts of methylhydroquinone was reacted at 80° – 110° C. for 4 hours, and a half-esterified compound was obtained with a conversion of 93.5%. To this compound, 190 parts of Sumiepoxy ELA-128 and 1.2 parts of triethylamine were added. The mixture was reacted at 80° – 130° C. for 3 hours and a syrupy resin was obtained. This resin is referred to as Sample F.

Comparative Example 2

A mixture of 2000 parts of Epikote 828 (epoxy resin produced by Shell International Chemicals Corp.), 98 parts of maleic anhydride, 687 parts of methacrylic acid, 0.01 part of hydroquinone and 11.3 parts of benzylmethylamine was reacted at 120° C. After 1 hour and 45 minutes from the start of the reaction, the viscosity of the reaction system rose sharply to cause gellation, so that the object product was not obtained.

Comparative Example 3

58.5 parts of maleic anhydride, 58 parts of trimellitic anhydride, 54 parts of isopropyl alcohol and 0.5 part of hydroquinone were put in a reaction vessel and were heated at 80° – 120° C. for 3 hours in a nitrogen atmosphere, and the conversion then reached 91.3%. After the internal temperature was cooled to 80° C., 380 parts of Sumiepoxy ELA-128, 46 parts of fumaric acid and 1.9 parts of triethylamine were added, and the reaction mixture was heated at 80° – 180° C. for 3 hours. A resin which is solid at room temperature and has an acid value of 5.7 was obtained. This resin is referred to as Sample G. As shown in the following Table 1, this resin was poor in self-polymerizability, so that the molded product from this resin by self-polymerization was substantially of no practical use.

The physical properties of the cured product (referred to as Sample G-2) from this resin by means of diallyl phthalate as the cross-linking agent are shown in Table 1. This resin was also not satisfactory in physical properties.

Comparative Example 4

A mixture of 166 parts of terephthalic acid, 164 parts of proplyene glycol, 0.08 parts of hydroquinone and 0.45 part of ortho-titanic acid-n-butyl ester (catalyst) was subjected to a dehydration-esterification reaction at 170° – 210° C. for 13 hours in a nitrogen atmosphere. The acid value in the reaction system then lowered to 8.4 and a resinous product was obtained which was pale yellow, transparent and viscous. To this product, 116 parts of fumaric acid was added and the reaction was continued at 180° – 320° C. for 5 hours, to obtain a resin which is solid at room temperature and has an acid value of 17.2. This sample is referred to as H.

Reference Example 1

Compositions for molding were prepared from the resins obtained in the previous Examples and Comparative Examples, under the following formulation. Each composition was kneaded at 90° – 100° C. After cooling, it was powdered and filled in a metallic mold and was molded under the molding conditions of 150° C. and 150 kg/cm². The physical properties of the molded products are shown in Table 1. The physical properties when diallyl phthalate resin (referred to as Sample I) only was used as the molding material are shown in Table 1 as Comparative Reference Example. Formulation of the compositions for molding:

| | |
|---|---|
| Each resin sample | 100 parts |
| Cross-linking agent | 30 parts |
| Catalyst (TBP) | 1.5 parts |
| Releasing agent (zinc stearate) | 6.5 parts |
| Filler (calcium carbonate: NS-100) | 350 parts |
| ¼" glass fiber | 100 parts |

Table 1

| | | Examples of the present invention | | | | |
|---|---|---|---|---|---|---|
| | Resins used (Name) | A | B | C | D | E |
| Properties of resins | Acid value | 11.5 | 6.4 | 7.2 | 4.8 | 11.5 |
| | Molecular weight | 2100 | 1900 | 3700 | 1800 | 2200 |
| | Iodine value | 66.7 | 56.1 | 68.4 | 83.8 | 88.6 |
| | Cross-linking agent upon molding | — | — | — | — | — |
| Properties of molded products | Barcole hardness while hot (Barcole 935; 150° C. 1 min.) | 42 | 51 | 64 | 50 | 48 |
| | Heat distortion temperature (HDT ° C.) | >180 | >180 | >180 | >180 | >180 |
| | Charpy impact value (kg.cm/cm²) | 2.3 | 2.2 | 2.2 | 2.4 | 2.4 |
| | Flexural strength (kg/mm²) | 9.1 | 9.9 | 9.3 | 9.0 | 7.8 |
| | Volume resistivity (normal state) | $4.1 \times 10^{15}$ | $4.5 \times 10^{15}$ | $3.2 \times 10^{15}$ | $3.1 \times 10^{15}$ | $4.1 \times 10^{15}$ |
| | (after boiling) | $5.7 \times 10^{14}$ | $6.6 \times 10^{13}$ | $4.4 \times 10^{14}$ | $3.0 \times 10^{14}$ | $2.3 \times 10^{14}$ |
| | Shrinkage on molding (%) | 0.20 | 0.29 | 0.33 | 0.35 | 0.27 |
| | Roll workability | Good | Good | Good | Good | Good |
| | Adhesiveness to metallic mold on molding | No | No | No | No | No |

| | | Comparative Examples | | | | Comparative Referential Example |
|---|---|---|---|---|---|---|
| | Resins used (Name) | F | G | G-2 | H | I |
| Properties of resins | Acid value | 2.7 | 5.7 | 5.7 | 17.2 | 1.2 |
| | Molecular weight | 710 | 2200 | 2200 | 2600 | 7500 |
| | Iodine value | 126 | 43 | 43 | 56 | 53 |
| | Cross-linking agent upon molding | — | — | Diallyl phthalate | Diallyl phthalate | Diallyl phthalate monomer |
| Properties of molded products | Barcole hardness while hot (Barcole 935; 150° C. 1 min.) | 17 | 0 | 12 | 33 | 10 |
| | Heat distortion Temperature (HDT ° C.) | 112 | 91 | 116 | >180 | >180 |
| | Charpy impact value (kg.cm/cm²) | 2.1 | 2.1 | 1.8 | 2.0 | 1.6 |
| | Flexural strength (kg/mm²) | 10.3 | 6.2 | 4.1 | 6.1 | 4.3 |
| | Volume resistivity (normal state) | $5.1 \times 10^{14}$ | $3.7 \times 10^{14}$ | $5.1 \times 10^{14}$ | $3.0 \times 10^{15}$ | $5.8 \times 10^{15}$ |
| | (after boiling) | $4.7 \times 10^{9}$ | $6.6 \times 10^{7}$ | $3.3 \times 10^{8}$ | $2.7 \times 10^{14}$ | $2.0 \times 10^{14}$ |
| | Shrinkage on molding (%) | 0.28 | 0.33 | 0.40 | 0.50 | 0.14 |
| | Roll workability | Some adhesion | Some adhesion | A little adhesion | A little adhesion | Good |
| | Adhesiveness to metallic mold on molding | A little adhesion | Some adhesion | Some adhesion | A little adhesion | Some adhesion |

What is claimed is:

1. An unsaturated epoxy ester which comprises the reaction product of the following three components:
   1. the first component selected from the group consisting of
      i. a partial esterification compound obtained by the reaction of trimellitic anhydride with an unsaturated monoalcohol,
      ii. a partial esterification compound obtained by the reaction of pyromellitic anhydride with an unsaturated monoalcohol, and
      iii. a mixture of (i) and (ii),
   2. the second component selected from the group consisting of
      i. a partial esterification compound obtained from a dicarboxylic anhydride and an unsaturated monoalcohol,
      ii. a polymerizable unsaturated monobasic acid, and
      iii. a mixture of (i) and (ii), and
   3. as the third component a compound containing at least two epoxy groups in the molecule, the unsaturated monoalcohol employed in (1)-(i) or (ii) being the same or different from that of (2)-(i) and the amount of unsaturated monoalcohol being equimolar to or slightly in excess of the whole acid component, and the ratio of total —COOH groups to the total

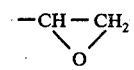

groups in the reaction system being 0.9 to 1.1.

2. An ester as claimed in claim 1 wherein the reaction is conducted in the presence of a dicarboxylic acid or a saturated or unsaturated alkyd having carboxyl groups at both terminals and/or a saturated or unsaturated monoglycidyl compound.

3. An ester as claimed in claim 1 wherein the unsaturated monoalcohol is selected from the group consisting of 2-hydroxyethyl acrylate, 2-hydroxyethyl methacrylate, 2-hydroxypropyl acrylate, 2-hydroxybutyl acrylate, 2-hydroxybutyl methacrylate, allyl alcohol, methallyl alcohol and their oxyalkylated derivatives.

4. An ester as claimed in claim 1 wherein the dicarboxylic anhydride is selected from the group consisting of saturated and unsaturated dibasic acids having an anhydride ring in the molecule.

5. An ester as claimed in claim 4 wherein the dicarboxylic anhydride is selected from the group consisting of phthalic anhydride, maleic anhydride, succinic anhydride, tetrahydrophthalic anhydride, hexahydrophthalic anhydride and HET anhydride.

6. An ester as claimed in claim 1 wherein the polymerizable unsaturated monobasic acid is selected from the group consisting of acrylic acid, methacrylic acid and crotonic acid.

7. An ester as claimed in claim 1 wherein the compound containing at least two epoxy groups in the molecule is selected from those of glycidyl ether type synthesized from epichlorohydrin or methylepichlorohydrin and a hydroxyl group-containing compound.

8. An ester as claimed in claim 7 wherein the glycidyl ether type compound is selected from the group consisting of glycidyl ether of 2,2-bis(4-hydroxyphenyl)propane, polyglycidyl ether obtained by reacting epichlorohydrin with a novolak, triglycidyl ether of glycerine and tetraglycidyl ether of tetraphenylethane.

9. An ester as claimed in claim 2 wherein the dicarboxylic acid is selected from the group consisting of maleic acid, fumaric acid, itaconic acid, adipic acid, isophthalic acid and terephthalic acid.

10. An ester as claimed in claim 2 wherein the saturated or unsaturated alkyd is selected from those obtained by reacting a polyhydric alcohol with polyvalent carboxylic acid, the carboxylic groups in the polyvalent carboxylic acid being 1.01 - 10 mols per mol of hydroxyl groups in the polyhydric alcohol.

11. An ester as claimed in claim 2 wherein the saturated or unsaturated monoglycidyl compound is selected from the group consisting of phenylglycidyl ether, butylglycidyl ether, allylglycidyl ether, glycidyl methacrylate and glycidyl acrylate.

12. An ester as claimed in claim 1 wherein the partial ester obtained from trimellitic anhydride and/or pyromellitic anhydride and unsaturated monoalcohol is employed in an amount of 25 - 95 mol % of the total mols of the whole acid component.

13. An ester as claimed in claim 2 wherein the total amount of the partial ester obtained from trimellitic anhydride and/or pyromellitic anhydride and unsaturated monoalcohol plus dicarboxylic acid or saturated or unsaturated alkyd having carboxyl groups at both terminals is 25 - 95 mol % of the total mols of the whole acid component.

14. An ester as claimed in claim 12 wherein said amount is 30 - 80 mol %.

15. An ester as claimed in claim 1 wherein the reaction is conducted at a temperature of 80° - 200° C.

16. An ester as claimed in claim 1 wherein the reaction is conducted in the presence of a catalyst selected from the group consisting of tertiary amines and quaternary ammonium salts.

17. An ester as claimed in claim 16 wherein the catalyst is selected from the group consisting of triethylamine, tetramethylammonium chloride and benzylmethylammonium chloride.

18. A process for the production of an unsaturated epoxy ester which comprises reacting the following three components:
(1) the first component selected from the group consisting of
(i) a partial esterification compound obtained by the reaction of trimellitic anhydride with an unsaturated monoalcohol,
(ii) a partial esterification compound obtained by the reaction of pyromellitic anhydride with an unsaturated monoalcohol, and
(iii) a mixture of (i) and (ii),
(2) the second component selected from the group consisting of
(i) a partial esterification compound obtained from a dicarboxylic anhydride and an unsaturated monoalcohol,
(ii) a polymerizable unsaturated monobasic acid, and
(iii) a mixture of (i) and (ii), and
(i) a partial esterification compound obtained from a dicarboxylic anhydride and an unsaturated monoalcohol,
(ii) a polymerizable unsaturated monobasic acid, and
(iii) a mixture of (i) and (ii), and
(3) as the third component a compound containing at least two epoxy groups in the molecule, the unsaturated monoalcohol employed in (1)-(i) or (ii) being the same or different from that of (2)-(i) and the amount of unsaturated monoalcohol being equimolar to or slightly in excess of the whole acid component, and the ratio of total —COOH groups to the total

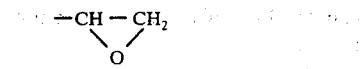

groups in the reaction system being 0.9 to 1.1.

* * * * *